E. W. POCOCK.
TRACTOR CONTROLLING DEVICE.
APPLICATION FILED JUNE 17, 1918.
1,326,369.
Patented Dec. 30, 1919.
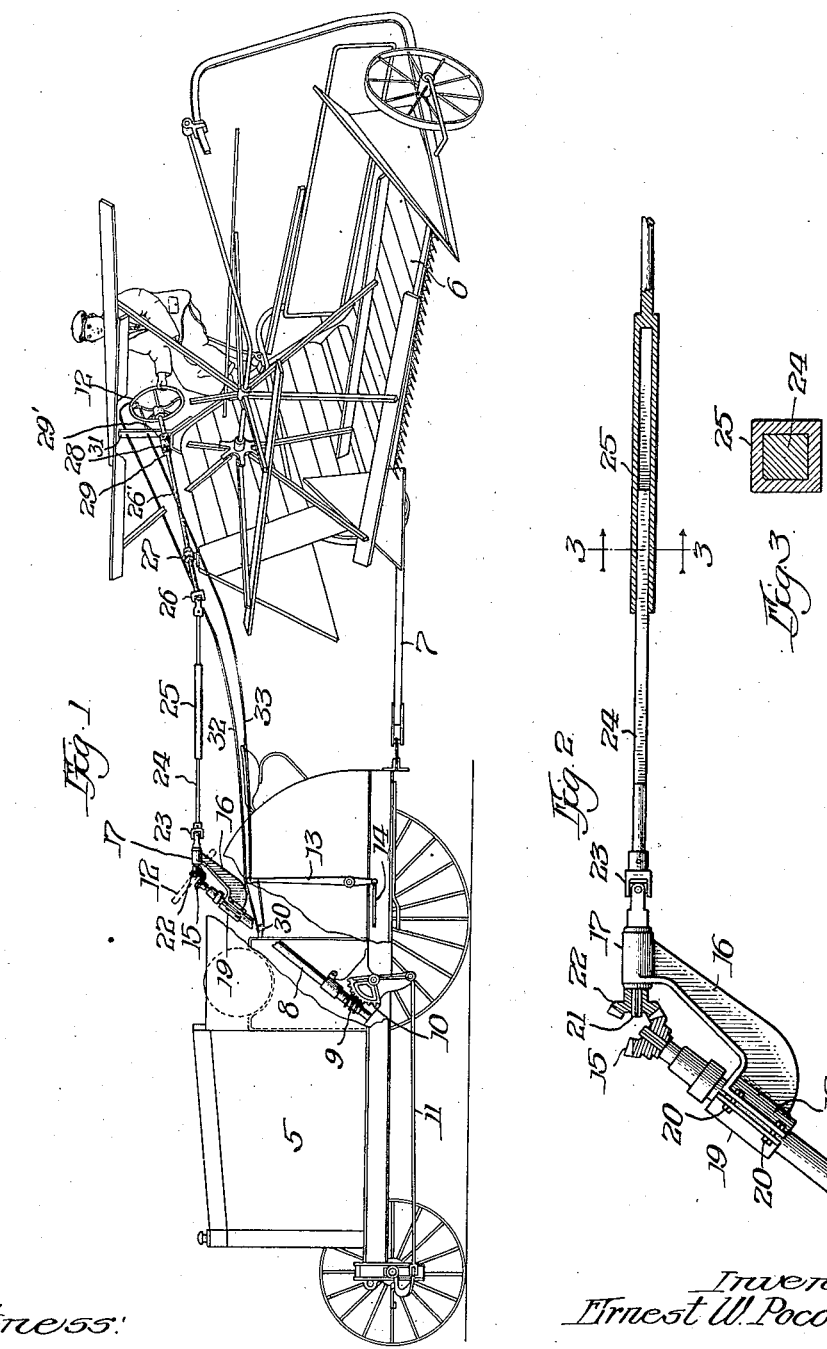
Witness:
Inventor
Ernest W. Pocock,
By James A. Walsh
Atty

UNITED STATES PATENT OFFICE.

ERNEST WEEKS POCOCK, OF WINNIPEG, MANITOBA, CANADA, ASSIGNOR TO J. I. CASE THRESHING MACHINE COMPANY, OF RACINE, WISCONSIN, A CORPORATION OF WISCONSIN.

TRACTOR-CONTROLLING DEVICE.

1,326,369.  Specification of Letters Patent.  Patented Dec. 30, 1919.

Application filed June 17, 1918. Serial No. 240.367.

*To all whom it may concern:*

Be it known that I, ERNEST W. POCOCK, a subject of the King of Great Britain, residing at Winnipeg, in the Province of Manitoba, Canada, have invented certain new and useful Improvements in Tractor-Controlling Devices, of which the following is a specification.

In the use of tractors it is the practice to attach implements thereto to be hauled about the field or otherwise, and in order to obviate the requirement of an attendant upon each vehicle, I employ a simple and readily controlled steering device for directing the tractor, and devices for manipulating the mechanisms for starting and stopping the same, all of which are under convenient and positive control of a single operator positioned upon the implement.

In the accompanying drawing, forming a part hereof, Figure 1 is a side elevation of a tractor of a well known type, showing a binder attached thereto, and which illustrates the application of my improvements; Fig. 2 a side elevation partly in section of my improved steering rod and parts associated therewith, and Fig. 3 is a transverse sectional view of said rod taken on the dotted line, 3, 3 in Fig. 2.

In said drawing, 5 indicates a tractor of any suitable design, to which a binder, 6, or other implement may be flexibly attached by a hitch, as 7.

Said tractor 5 is provided with a steering post, 8, having the usual steering worm, 9, which engages a toothed segment, 10, as indicated, which latter communicates through rod, 11, with the front axle of the tractor in any appropriate manner, the upper end of said post being provided with a steering wheel, 12, for manipulating the same and the steering mechanisms connected therewith. Also, as is common, the tractor is equipped with a clutch lever, 13, which communicates with its clutch mechanism (not shown), through a connecting rod, 14, said steering wheel and clutch lever being within convenient reach of the operator. This is the common commercial arrangement of the tractor when supplied for ordinary usage. However, when it is desired for service in hauling other implements of a character such as illustrated, or otherwise, where a single attendant is required to operate both vehicles, I am enabled in the following manner to readily equip such vehicle so that said tractor can be controlled from a position upon the implement. The ordinary steering-wheel, 12, is removed from post 8, and in its stead I affix a gear-wheel, 15, of any suitable character. As said post is commonly arranged in inclined position, I apply thereto a bracket embodying an arm, 16, preferably arranged in parallel relation to said post, the upper end of said arm being provided with a bearing, 17. At its lower end said arm has a shoulder, 18, adapted to conform to the contour of the steering post and which is attached to said post by a clamp, 19, secured to said shoulder by bolts, 20, or in any suitable manner. In bearing 17 I insert a rod, 21, and mount at the end thereof a gear-wheel, 22, which engages gear 15 to actuate the same. Said rod 21 is provided with a universal joint, 23, communicating with a rod extension, 24, which is telescopically mounted in a tubular shaft, 25, said latter shaft also being provided with a universal joint, 26, to which an extension rod, 26', is attached and which latter is supported on the implement in a bearing, 27, and extends rearwardly therefrom through another bearing, 28, in which bearings it is rotatably mounted, the longitudinal movement of said rod being prevented by collars, 29, 29', or other appropriate means associated with bearing 28. This sequential arrangement of rods and shaft constitutes a continuous flexible steering rod communicating with the steering post of the tractor and the implement attached thereto and in securing steering-wheel 12 at the end thereof I produce substantially as convenient a steering rod arrangement for controlling the direction from the attached implement as existed on the tractor before the removal of said steering-wheel. In this manner an operator on the implement can readily control the action of the tractor, and as steering-wheel 12 remains in fixed position within his convenient grasp, and as the telescoping steering rod becomes automatically longitudinally adjustable according to the turning or flexing of the tractor, the latter can be positively steered in any direction at will, notwithstanding the angular or other relation of the same to the implement which it draws. The rotary flexibility of said shaft, of course, is provided through the universal joints indicated in Fig. 1, while its positive longitudinal adjustment is permitted through the character of the telescopic shaft sections indicated in Figs. 2 and 3, which control said sections against independent rotary movement. Said sections may be square in cross section, or splined or otherwise arranged so that rotary motion will be transmitted to section 24.

As it becomes necessary to control the starting and stopping of the tractor, I provide flexible means for this purpose, simple in arrangement and operation, and within convenient reach of the operator, who is thus not only enabled to have complete steering control of the tractor as heretofore explained, but at will may stop and start the same or regulate the speed thereof in a simple and convenient manner, by means which conform to the flexibility of the movements of the tractor and implement attached thereto. This I accomplish by a rope or cable, one end of which is attached to clutch rod 13 and passes around a pulley, 30, or other suitable guide to a bracket, 31, through which it passes and returns, its opposite end being also secured to said clutch rod, 13. Sufficient slack is given the rope or cable to not interfere with the turning of the tractor in different directions, and by supporting the strands, 32, 33, thereof in the bracket in the manner indicated they are kept apart so that the operator may instantly manipulate either without confusion as to the results, that is to say, when he desires to throw the clutch in one position he pulls the upper strand 32, which, through the rod 13, actuates said connecting rod 14 to shift the clutch, and when the latter is to be reversed the strand 33 is pulled, which imparts an opposite effect on the clutch rod; in other words, an operator will know that the rope or cable, passing through or about one portion of the bracket 31 is for starting and the other for stopping the tractor. It will be understood, of course, that I do not desire to limit myself to the precise form of bracket or rope and controlling arrangements shown, as any appropriate means substantially of similar character for maintaining said rope in operative relation with the clutch and within convenient reach of the operator may be employed.

As will be observed, my improved steering attachment can be readily applied to a tractor and implement with slight effort and time by simply removing the regular steering wheel 12 and installing the bracket 16 and gear 15, together with the telescoping flexible steering rod and parts associated therewith, and connecting the latter to the implement with the steering-wheel re-located at the end thereof, and the whole arrangement may as readily be removed therefrom and said steering-wheel returned to the steering post 8, when the tractor regains normal condition. As will also be understood, the flexible clutch controlling device described may be readily applied and removed. In this simple manner I am enabled to furnish the extensible steering and clutch controlling mechanisms separately from the regularly arranged tractor to be applied thereto as required, or which attachments may be installed upon tractors already in use.

I claim as my invention:

1. The combination, with a tractor and a portable implement attached thereto, of a steering-post on said tractor, a gear-wheel thereon, a bracket on said post comprising a bearing, an extensible rod mounted in and having a flexible joint adjacent said bearing, a gear on said rod meshing with said first-mentioned gear, means on said implement for supporting said rod in stationary position, a flexible shaft in said rod in advance of said supporting means, and means for actuating said gears through said rod.

2. The combination, with a tractor and a portable implement attached thereto, said tractor embodying steering means, a removable bracket secured to said steering means, a flexible shaft section engaging said steering means, a shaft section telescoping upon said first named shaft section, a shaft section mounted upon said implement in stationary position, and a universal joint for connecting said two last mentioned sections.

In testimony whereof I affix my signature in the presence of two witnesses.

ERNEST WEEKS POCOCK.

Witnesses:
G. HALL,
HELEN M. ROBINSON.